(12) United States Patent
Hass et al.

(10) Patent No.: US 6,591,359 B1
(45) Date of Patent: Jul. 8, 2003

(54) SPECULATIVE RENAMING OF DATA-PROCESSOR REGISTERS

(75) Inventors: David Hass, Santa Clara, CA (US); Michael P. Corwin, Sunnyvale, CA (US); Luke E. Girard, Santa Clara, CA (US); Ken Arora, Cupertino, CA (US); Harshvardhan Sharangpani, Santa Clara, CA (US); Syed Reza, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,843

(22) Filed: Dec. 31, 1998

(51) Int. Cl.[7] ................................................. G06F 9/34
(52) U.S. Cl. ....................................................... 712/217
(58) Field of Search .................................. 712/217, 216, 712/218

(56) References Cited

U.S. PATENT DOCUMENTS

| 5,083,263 A | * | 1/1992 | Joy et al. |
| 5,740,414 A | * | 4/1998 | Tovey et al. ................. 712/233 |
| 5,870,597 A | * | 2/1999 | Panwar et al. ............... 712/230 |

* cited by examiner

*Primary Examiner*—Richard L. Ellis
(74) *Attorney, Agent, or Firm*—Schwegman, Lundberg, Woessner & Kluth, P.A.

(57) ABSTRACT

A pipelined data processor has instructions at different stages of execution. Some of the instructions specify virtual addresses into a file of registers having physical addresses. A speculative translator maps the virtual registers of an instruction at one pipeline stage into physical registers for speculative use by the instruction at a later pipeline stage. The registers have multiple differently translated regions. Failure of speculative renaming reverts to an archive copy of renaming data.

28 Claims, 4 Drawing Sheets

SPECULATIVE RENAMING OF DATA-PROCESSOR REGISTERS

TECHNICAL FIELD

The invention relates to electronic data processing, and more specifically concerns speculative translation of register addresses in pipelined data processors.

BACKGROUND

The performance of data processors, and especially of integrated-circuit microprocessors, increases steadily as clock speed rises and as the size of individual components shrinks, permitting greater architectural complexity.

Most of the instructions in almost every program merely move data from one place to another, rather than actually manipulating it. Therefore, avoiding data transfers has a potential for increasing performance significantly. Microprocessors having modern RISC (reduced instruction set computer), superscalar, and similar architectures have large files of internal registers that most instructions address directly for operands and results. Because these general-purpose architectural registers typically lie on a critical execution path, their speed is very important for overall processor performance.

No matter how many general-purpose registers a processor has, programs always need more. For example, subroutine calls must preserve the state of calling-program registers, yet the called subroutine also uses a full set of registers. Software pipeline looping, sometimes called rotating scheduling, permit virtual unrolling of program loops for faster execution in superscalar processors. This feature presents a more recent requirement for large numbers of quickly switchable registers.

One way to avoid impossibly large numbers of registers while avoiding the delay of moving data from one register to another is to leave the data where it is and change the effective addresses of the registers. That is, renaming a register can be faster than moving its contents to another register having the proper fixed address. However, sophisticated renaming algorithms become complex, and some must vary the address mappings on an instruction-by-instruction basis. Therefore, the translation that implements the renaming operation requires high speed and efficiency, including quick turn-around for register-mapping changes.

SUMMARY

The invention providess a pipelined data processor having instructions at different stages of execution. Some of the instructions specify virtual addresses into a file of registers having physical addresses. A speculative translator maps the virtual registers of an instruction at one pipeline stage into physical addresses for speculative use by the instruction at a later pipeline stage.

DRAWING

DETAILED DESCRIPTION

Figure 1:
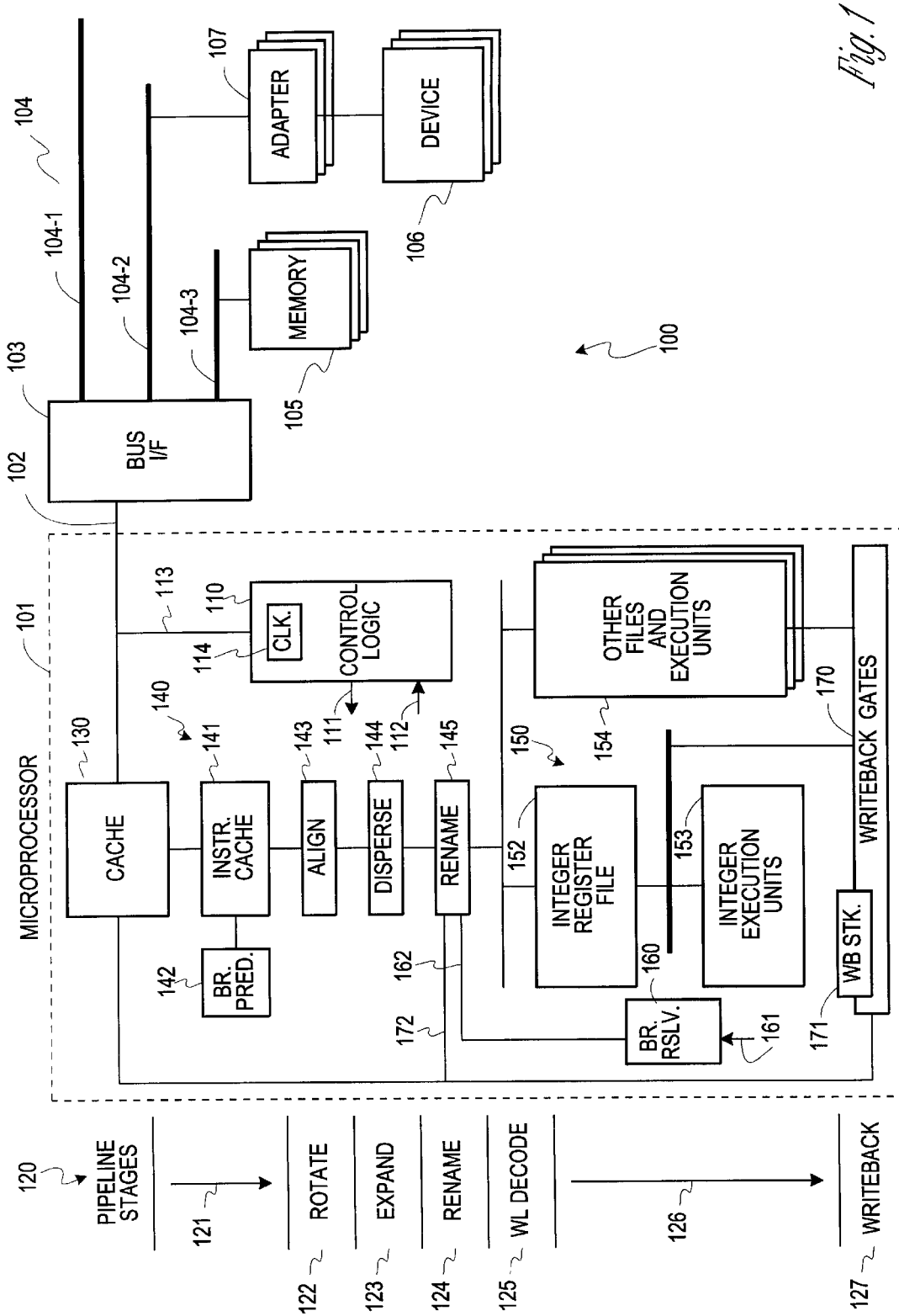
FIG. 1 is a block diagram of a computer system in which the invention can be implemented.

FIG. 1 shows an illustrative data-processing system 100 in which speculative register renaming provides a performance advantage. Microprocessor 101 transfers data, address, and control signals 102 to a bus-interface chipset that distributes them to a number of buses 104 for different purposes. System memory modules 105 hold program instructions and data, and communicate with processor 101 over a fast bus 104-1. Hardware devices 105 such as keyboards, displays, disk drives, printers, and modems couple to bus 104-2, some through conventional adapters 106. Other buses such as 104-3 can connect to other resources, not shown.

Microprocessor 101 can be fabricated on a single integrated-circuit chip, indicated by the dashed line in FIG. 1, although multi-chip implementations are also possible. Control logic 110 produces control signals 111 for the remaining components in response to internal status inputs 112, external signals 113, and clock 114. Line 113 can also carry signals to external components over bus 102. In this example, microprocessor 101 has a superscalar, highly pipelined architecture. The function of control logic 110 with respect to the invention is to manage the peristaltic pipeline indicated symbolically at 120. Only the relative sequence of the relevant stages is important for the present purpose; the names, number, and propinquity of these and other stages is not significant.

Cache 130 can be located inside or outside microprocessor 101, or partly inside and partly outside. Instruction decode subsystem 140 includes an instruction cache 141 for storing instructions awaiting execution. Branch predictor 142 analyzes pending instructions for conventional speculative execution of instructions within the processor during one or more pipeline stages 121. The superscalar architecture of the processor employs conventional alignment logic 143 to manipulate the individual syllables of a very long instruction word (VLIW) during "Rotate" pipeline stage 122. Dispersal logic 144 sends the syllables, each corresponding to an entire instruction in other architectures, to particular execution destinations for parallel execution during an "Expand" stage 123. Each syllable will be referred to as an instruction, which it would correspond to in other architectures.

An instruction might contain numbers referring to addresses of architected general-purpose registers holding operands, results, and other data relating to the instruction. Renaming unit 145 contains logic for translating these numbers to numbers representing actual physical registers during a "Rename" stage 124 of pipeline 120. The speculative operation of renaming unit 145 according to the invention employs inputs from units at other stages of the pipeline as well.

Function subsystem 150 moves operands and other data over bus 151 to register file 152, which connects to one or more execution units 153. Other register files and execution units 154 are usually present as well. File 152, for storing integer operands and data, is a convenient paradigm for illustrating the invention because it participates in renaming modes that are not allowed to other register files in the present embodiment. In terms of pipeline 120, "Word Line Decode" stage 125 sends translated addresses of the physical registers to files 152 and 154. Stages 126 perform other operations not relevant here.

During one of the execution stages 126 subsequent to renaming stage 124, a branch resolver 160 determines whether the prediction made in unit 142 turned out to be correct, in response to condition signals 161 produced in function unit 150. An unanticipated branch, or similar control-flow instruction or condition, could have invalidated the speculative operations already performed by previous stages, including those in renaming stage 124. In that case, the resolver produces a signal 112 causing control unit 110 to flush the pipeline and restart from a known point. Fail signal 162 informs speculative renaming logic 145 that its previous translation calculations are incorrect and must be redone.

Writeback gating logic, shown schematically at 170, causes results and other state information to be written to the proper locations in processor 101 when their respective instructions have successfully completed execution at pipeline stage 127. Writeback stack 171 holds state information relevant to the speculative renaming process of the invention. Line 172 returns this information to renaming unit 145 for use when a fail signal occurs on line 162.

Figure 2:
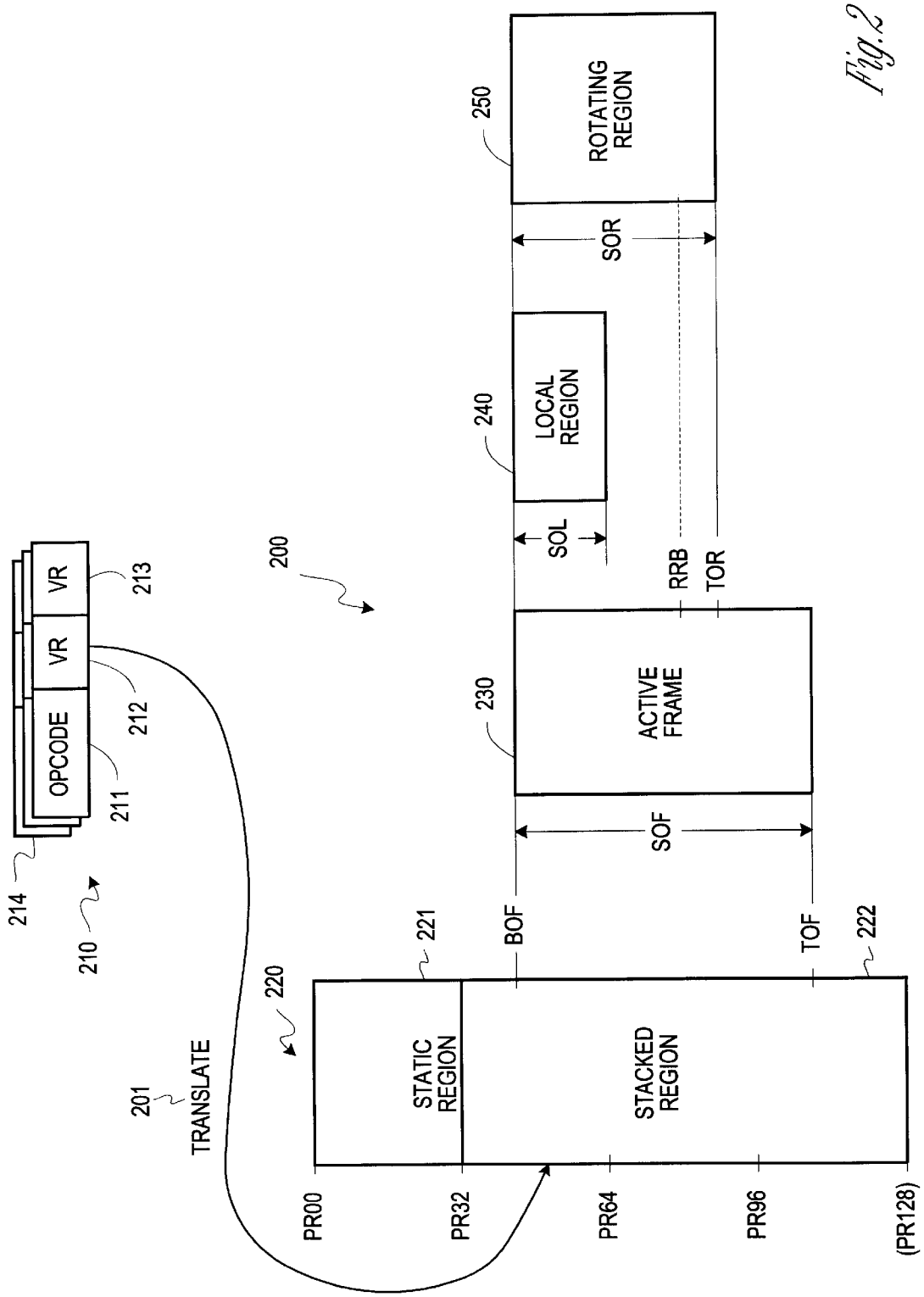
FIG. 2 is a symbolic representation of register-file regions of the system of FIG. 1.

FIG. 2 pictures a representative organization 200 of a register file 152, FIG. 1, that can be renamed or mapped speculatively in the invention. In this example, an instruction 210 contains an opcode 211 and operands 212 and 213 that each specify an address 0–127 (hex 00-7F) of one of the 128 registers in file 152, shown symbolically as block 220 in FIG. 2. All of the actual numbers in this description depend upon the design of an actual implementation, and can be modified easily. An address such as 212 is a virtual address, rather than the physical address of a particular hardware register. In fact, other instructions, possibly from unrelated programs or execution threads, are concurrently accessing the same physical file of registers. Therefore, operation 201 translates this virtual address in the instruction to a physical or real address of a particular physical register in the file. FIG. 2 designates the addresses of virtual addresses as "VR," and the addresses of physical registers as "PR," e.g., PR00–PR127. The number of physical registers need not be the same as the number of virtual registers. Also, register spill and fill facilities can make the number of registers appear to be as large as desired.

The 128 general-purpose integer registers 220 are organized as two major regions or groups. Static region 221 includes registers at addresses 00 to 31. In this region, PR=VR. That is, an instruction that asks to read or write a register at one of these addresses accesses the physical register at the same address that it specifies, without any translation. This static mode provides global registers shared by all programs at all times.

Stacked region 222 has 96 registers at addresses 32–127. An instruction specifying one of these virtual addresses may actually read or write a register at a different physical address. Software written for processor 101 has program-flow commands such as Call and Return instructions that can specify a physical register address $\geq 32$ as the bottom of a current frame (BOF). Other commands such as Allocate instructions set additional parameters for govern frame organization. An ALLOC specifies a size of a frame (SOF) 230. In FIG. 2, TOF represents the register number at the top of a frame; TOF=BOF+SOF. Because there are still 96 registers in the stacked region, addresses exceeding the physical boundary of 127 are wrapped around to the beginning of the stacked region. Therefore, an instruction naming a register in the range $32 \leq VR \leq 127$ actually accesses a physical register PR=(BOF+VR)mod96. The mod96 function performs a modulo-96 operation and then adds 32, to avoid wrapping into static region 221. Because the number of static registers and the number of total registers are arbitrary, the mod96 function will differ for different numbers and placements of registers.

In this embodiment, frames themselves have regions. Local region 240 of frame 230 contains register addresses that belong to a particular level of a program. When the program calls another routine or otherwise initiates a new level, the contents of the local registers are pushed onto a stack, and are popped back again when the calling routine resumes. Although local region could start at any fixed or variable point, system 100 anchors it at the BOF register address. An ALLOC parameter named SOL denotes the number of registers in the local region. Local regions have no separate effect upon mapping; the local register addresses follow the BOF for the entire frame.

Rotating regions permit virtual unrolling of program loops for faster execution in system 100. Register addresses in these regions are indexed at a fixed rate in synchronization with program instructions that use them. Their only characteristic germane to the present invention is how their addresses are renamed. Rotating region 250 starts at BOF and overlaps region 240 in system 100, although other placements are possible. An ALLOC instruction specifies the size of the rotating region (SOR). RRB is the address of the rotating region's base register for any given instruction. Thus, for any register $32 \leq VR < 32 + SOR$, the mapping function for an instruction whose registers are being renamed is:

$$PR=(((RRB+VR)\bmod(32+SOR))+BOF)\bmod 96,$$

where mod is the normal modulo function of the total number of architected registers in the stacked region, and mod96 is the modular operation above that skips over the static registers.

Other regions can be defined if desired. The region variables BOF, SOF, SOR, etc. are mutually independent. That is, aside from physical limitations, the variables specifying the different regions need not have any functional dependence upon each other.

Figure 3:
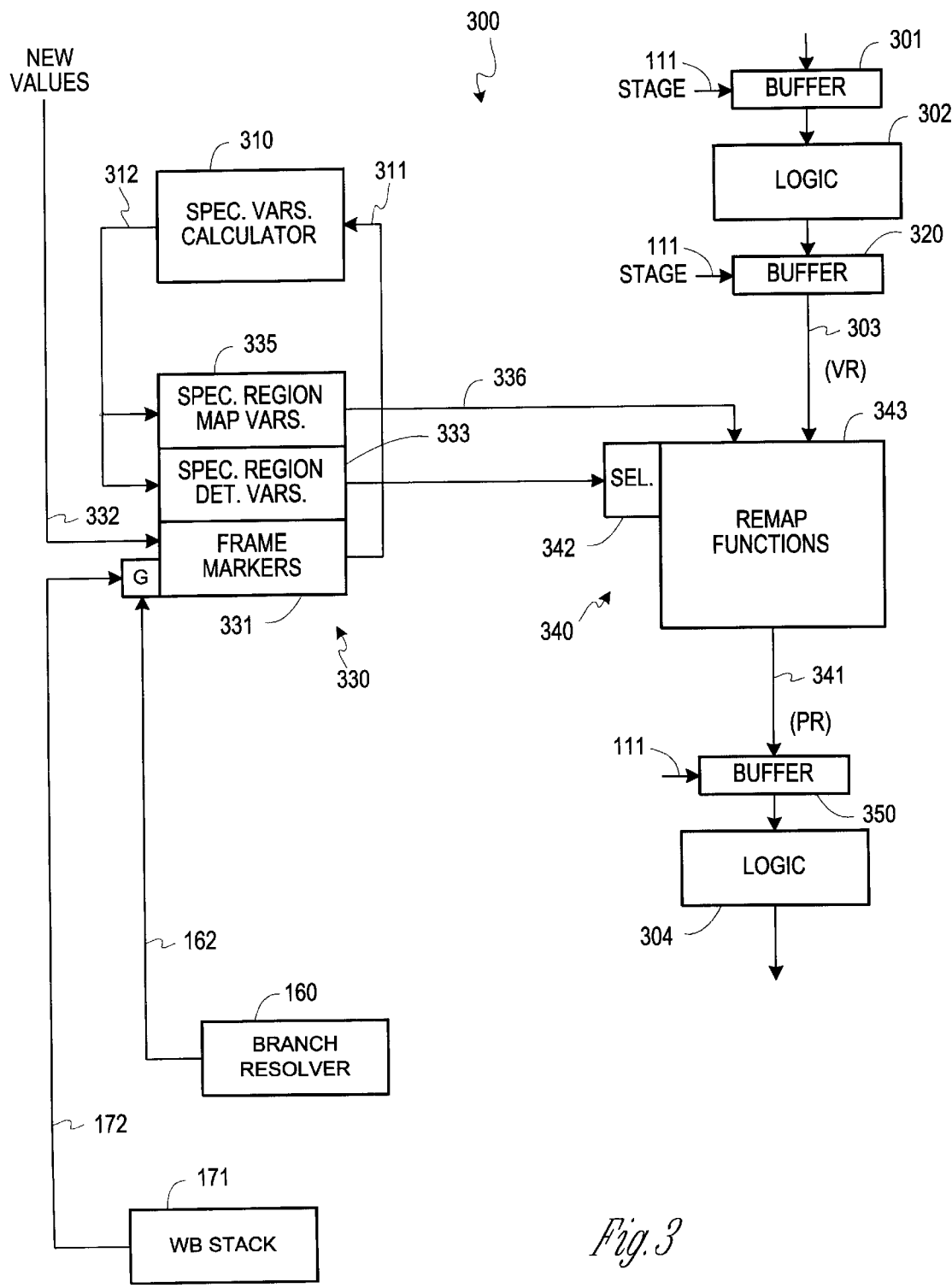
FIG. 3 is a block diagram of speculative renaming logic according to the invention.

FIG. 3 is a block diagram of components 300 for speculative renaming of registers in a file. Components that do not themselves participate in renaming have reference numbers less than 310. The particular functions, number, and propinquity of these units are not significant for the present discussion.

In this embodiment, the pipeline unit before the renaming unit is dispersal unit 144 at pipeline stage 123. Although system 100 processes multiple instructions concurrently, this description follows the progress of a single instruction; any others are handled similarly. The dispersal unit includes a buffer 301 that holds one or more virtual register addresses specified in the instruction. As dispersal logic 302 processes one of the instructions, speculative calculator 310 calculates the values of certain variables for use in translating the registers.

A stage-clock timing signal 111 from control unit 110 gates the instruction from the dispersal unit to buffer 320 of renaming unit 145, and also gates the precalculated translation variables to a set of current-frame logic 330. Current frame marker (CFM) register 331 holds the state variables required for mapping a VR of the instruction into its PR addresses: BOF, SOF, SOR. and RRB. (SOL is stored there also, but is not needed for translation.) Input 332 introduces new variables from ALLOC instructions and other sources. Output 311 supplies the current state variables to calculator 310.

Speculative region detector 333 receives on line 312 the variables needed to determine which region the VR occupies. These variables, calculated in calculator 310, are RD2=31+SOR and RD3=31+SOR-RRB. Detector 333 produces a region signal on line 334 indicating which of four regions the VR address occupies:

Region 1 if: VR<32

Region 2 if: (VR>RD2) AND NOT Region 1

Region 3 if: (VR>RD3) AND NOT (Region 1 OR Region 2)

Region 4 if: NOT (Region 1 OR Region 2 OR Region 3)

Region 1 is the static region 221, FIG. 2. Region 2 is the stacked non-rotating group, all of region 222 except for 250. Regions 3 and 4 are stacked rotating region 250; region 3 wraps around TOR, but region 4 does not. Regions 3 and 4 can be combined; they are separated here for convenience of calculation.

Speculative mapping register 330 stores mapping variable values needed to translate the addresses in each of the four regions, viz:

Region 1: None

Region 2: RM2=BOF

Region 3: RM3=BOF+RRB-SOR

Region 4: RM4=BOF+RRB.

Calculator 310 also produces these values, and transmits them to register 335 on line 312.

Remapping translator 340 receives a VR address on line 303 from the previous pipeline stage, and outputs the corresponding PR address on line 341 to a buffer 350, whence a control signal 111 gates it (and the rest of the instruction) to the following pipeline stage, word-line decoder 304 in this case. Remap functions 341 combines the VR on line 303 with the proper one of the mapping variables on line 336 from register 335. Selector logic 342 employs the region signal 334 to select the proper mapping variable from the above list and to select a function for combining it with the VR. The mapping algorithms that can be performed by block 343 are:

Region 1: PR=VR

Region 2: PR=(VR+RM2)mod96

Region 3: PR=(VR+RM3)mod96

Region 4: PR=(VR+RM4)mod96

Buffer 350 holds the calculated physical register number and passes it to word-line decoder 304 in stage 125 upon receipt of the proper control signal 111.

Each instruction can specify multiple registers, as shown at 212 and 213 in FIG. 2. In addition, system 100 employs a VLIW architecture having multiple instructions or syllables in the same pipeline stage at once. Therefore, although FIG. 3 shows only a single renamer, many registers can be renamed in parallel. In system 100, each register uses the same translation variables, although these could be mutually independent if desired. Additional sets of renamers simultaneously translate VR specifications into PR addresses for the other register files indicated at block 154, FIG. 1. These files can organized differently from register file 152, and their renamers can have different, independent translation variables.

Because register renaming is speculative, it is possible that the PR address in buffer 350 will turn out to be invalidated by another instruction, such as a taken branch at another stage of pipeline 120. Prediction-failure signals from resolver 160 cause control unit 110, FIG. 1, to flush all the invalid instructions from pipeline 120 in a conventional manner. During the flush operation, one of the fail signals, 162, allows gate 337 to replace the now invalid current frame markers in CFM register 331 with an archived copy of markers from a previous valid instruction, stored in writeback stack 171 and transmitted on line 172. The dashes in line 338 indicate that these markers have traveled down pipeline 120 from a previous instruction.

In theis embodiment, an invalidation requires remapping the PR address from the current instruction's VR address, because sme or all of the variable values might be different. In many implementations, however, renaming components 300 can recalculate all the necessary variables in the shadow of the flush—that is, during the same time that other unrelated operations restore the proper instructions to the proper pipeline stages. In such cases, a speculative renaming failure never penalizes the overall speed of the system.

Figure 4:
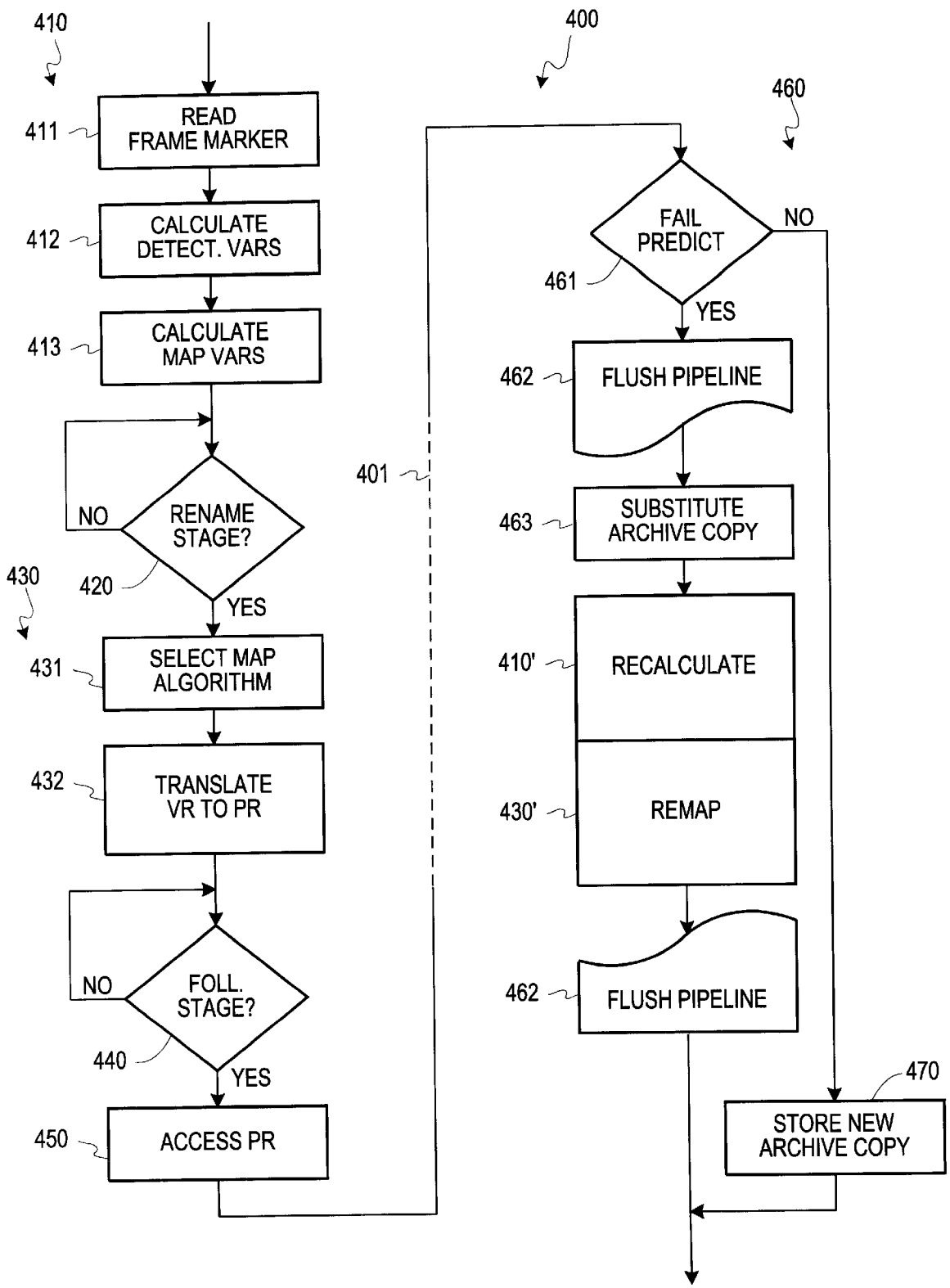
FIG. 4 is a flowchart of a speculative renaming method according to the invention.

FIG. 4 is a flowchart of a method 400 for translating or mapping registers. Method 400 follows one VR specification of one instruction through pipeline 120, and is carried out for every VR address of every instruction. In the architecture of illustrative system 100, multiple instances of method 400 occur concurrently, for multiple VRs in the same instruction and for multiple instructions in the same word.

Blocks 410 precalculate certain variables at a pipeline stage previous to renaming stage 124. Block 411 reads the current frame marker (CFM) values of BOF, SOF, RRB, and SOR. (Again, some register files might require less or other than these, depending upon their permitted operating modes.) Block 412 uses those values to calculate the detection variables RD2 and RD3 described above. Block 413 precalculates the values of the mapping variables RM2, RM3, and RM4. The advantage of performing these steps separately is to eliminate the time delay from additional layers of arithmetic in the critical path by first combining all the variables that do not depend upon the VR value.

Block 420 indicates the arrival of the current instruction at rename stage 124 of the pipeline. Because blocks 410 have already performed most of the arithmetic, blocks 430 need only perform simple operations to map the VR address to its PR equivalent. Block 431 selects the appropriate mapping algorithm for the region that the VR occupies, according to the detection variables found in block 412. The selected block 432 then applies that mapping algorithm to the VR address to produce a PR address.

Block 440 passes this PR address to a following pipeline stage, where block 450 can process it, such as by applying it to access a physical register.

At a subsequent point in pipeline 120, indicated by dashed line 401, blocks 460 resolve predictions made during preceding speculative operations. If block 461 finds a prediction failure involving the current instruction, block 462 flushes all or part of the pipeline. In this event, block 463 substitutes an archived copy of the CFM variables from a previous valid instruction. Steps 410' and 430' then repeat the operations of blocks 410 and 430 for the subject instruction. These recalculations and remappings can be performed in the same manner as they were done originally, or in different ways if desired. If block 461 determines that the current execution has executed successfully, then block 470 stores its frame markers as the new archive copy for use if a subsequent instruction fails.

The above description presents an embodiment in a particular microprocessor architecture. Variations and adaptations to other forms of digital processors will occur to those skilled in the art. For example, register organizations other than frames, rotating regions, etc. are possible. Even treating all registers in a file as a single block or renaming individual registers would marshal the advantages of the invention.

We claim:

1. A method for translating register names in a data processor having pipelined instructions, comprising:

mapping a virtual register associated with a first instruction at a first stage in the pipeline to a physical register, the mapping comprising:

calculating at least one mapping variable relating an address of the virtual register to an address of the physical register;

combining the mapping variable with the address of the virtual register;

after the instruction reaches a second stage in the pipeline, determining whether another instruction in the pipeline has invalidated the mapping of the first instruction;

if the mapping has not been invalidated, accessing the physical register during execution of the first instruction.

2. The method of claim 1 where the mapping variable represents an offset between the address of the virtual register and the address of the physical register.

3. The method of claim 1 comprising calculating multiple mapping variables representing multiple independent offsets between the address of the virtual register and the address of the physical register.

4. A method for translating register names in a data processor having pipe lined instructions, comprising:

receiving a first state variable specifying a parameter representing the beginning of an entire contiguous block of physical registers that can be used by one of the instructions;

receiving a virtual register specification from an instruction;

mapping the virtual register specification to a physical register specification by combining the first state variable with the virtual register specification and with a modulus at least partially specified by the size of the block; and accusing a physical register for the instruction in accordance with the combination of the state variable and the virtual register specification.

5. The method of claim 4 where the physical registers have multiple static registers for which the specification of a virtual register in the instruction always accesses the same physical register, without mapping.

6. A method for translating register nan in a data processor having pipelined instructions, comprising:

receiving a first state variable specifying a parameter of a entire contiguous block of physical registers that can be used by one of the instructions;

receiving a virtual register specification from an instruction;

mapping the virtual register specification to a physical register specification by combining the first state variable with the virtual register specification;

accessing a physical register for the instruction in accordance with the combination of the state variable and the virtual register specification;

receiving a second state variable representing a parameter of a contiguous frame of physical registers that can be used by the one instruction;

mapping the virtual register specification to a physical register specification by combining both of the state variables with the virtual register specification; and accessing a physical register for the instruction in accordance with the combination of both state variables and the virtual register specification.

7. The method of claim 6 where the second state variable represents the location of the frame of contiguous registers within the block of contiguous registers.

8. The method of claim 7 where the frame of registers lies within the block of registers.

9. The method of claim 7 where the frame parameter represents the size of the frame, and wherein mapping is performed with a modulus at least partially specified by the frame variable.

10. The method of claim 6 further comprising:

receiving a third state variable representing a parameter of a region of contiguous physical registers;

mapping the virtual register specification to a physical register specification by combining all three of the state variables with the virtual register specification; and accessing a physical register for the instruction in accordance with the combination of all three state variables and the virtual register specification.

11. The method of claim 10 where the region of registers lies within the frame of registers.

12. The method of claim 10 where the region is a local region of physical registers.

13. The method of claim 10 where the region is a rotating region to unroll a sequence of instructions such that a single virtual register specification is mapped into multiple physical registers simultaneously during execution of the instruction sequence.

14. The method of claim 10 where the frame parameter represents the size of the region, and wherein mapping is performed with a modulus at least partially specified byte region variable.

15. The method of claim 10 further comprising:

detecting which of a number of portions of the frame contains the virtual register specification; and mapping the virtual register specification to a different physical register depending upon which portion contains the virtual register specification.

16. A method for translating register names in a data processor having pipelined instructions, comprising:

(a) receiving a first state variable identifying physical registers for a first of the instructions;

(b) storing a first value of the first state variable;

(c) receiving a virtual register specification from a first instruction;

(d) mapping the virtual register specification to a physical register specification by combining the first state variable with the virtual register specification;

(e) accessing a physical register for the instruction in accordance with the combination of the state variable and the virtual register specification;

(f) repeating (b) through (e) for a second instruction having a second value of the state variable;

(g) determining that a third instruction in the pipeline has invalidated the mapping of the second instruction; and (h) repealing (b) through (e), remapping the virtual register specification in accordance with a value of the first state variable different from the second value.

17. The method of claim 16 where the different value of the state variable is the first value.

18. The method of claim 16 where the mapping operation is performed when the instruction is at one stage of the pipeline, and the determining operation is performed at a subsequent stage of the pipeline.

19. The method of claim 18 where remapping occurs after the first stage of the pipeline.

20. The method of claim 16 further comprising mapping and remapping the virtual register specification in accordance with at least additional state variable.

21. The method of claim 20 further comprising storing a first value of the additional state variable along with the first state variable.

22. A data processor, comprising:
   a pipeline to store a current instruction containing at least one virtual register address;
   a file of registers each having physical addresses;
   a calculator to produce values of a plurality of speculative variables;
   a speculative translator to combine the variables with the virtual register address from the instruction to form a physical address of one of the register in the file corresponding to the virtual register address;
   a selector to gate of the speculative variables to the speculative translator for combination with the virtual register address; and
   a region detector to produce representations of a plurality of regions from the speculative variables, where the selector determines which region contains the virtual register address.

23. The data processor of claim 22 where the virtual register address is the same as the physical address when the virtual address lies within a first of die regions.

24. The data processor of claim 22 where the virtual register address is added to one of the speculative variables when the virtual address lies within a second of the regions.

25. The data processor of claim 22 further comprising a branch resolver to produce a fail signal when a speculative branch in the pipeline fails.

26. The data processor of claim 25 further comprising:
   a writeback unit to store a value of the speculative variable relating to a instruction previous to the current instruction; and
   a gate responsive to the fail signal for replacing the value of the speculative variable relating to the current instruction with that relating to the previous instruction.

27. A data processing system, comprising;
   a processor including
      a pipeline to hold a current instruction containing at least one virtual register address;
      a file of registers each having physical addresses,
      a calculator to hold values of a plurality of speculative variable,
      a speculative translator to combine the variables with the virtual register address from the instruction to form a physical address of one of the registers in the file corresponding to the virtual register address,
      a selector to gate one of the speculative variables to the speculative translator for combination with the virtual register address,
      a region detector to produce representations of a plurality of regions from the speculative variables, where the selector determines which region contains the virtual register address; and
   a memory to store a plurality of instructions including the current instruction,
      at least one allocate instruction to specify a set of values for the speculative variables; and
   a bus for transmitting the plurality of instructions from the memory to the processor.

28. The system of claim 27 where the processor further includes
   a branch resolver to produce a fail signal when a speculative branch in the pipeline fails;
   a writeback unit to store a value of the speculative variable relating to an instruction previous to the current instruction; and
   a gate responsive to the fail signal for replacing the value of the speculative variable relating to the current instruction with that relating to the previous instruction.

* * * * *

UNITED STATES PATENT AND TRADEMARK OFFICE
CERTIFICATE OF CORRECTION

PATENT NO.      : 6,591,359 B1
DATED           : July 8, 2003
INVENTOR(S)     : David Hass et al.

It is certified that error appears in the above-identified patent and that said Letters Patent is hereby corrected as shown below:

<u>Title page, Item [54] and Column 1, lines 1 and 2,</u>
Delete "SPECULATIVE RENAMING OF DATA-PROCESSOR REGISTERS" and insert -- MAPPING VIRTUAL REGISTER SPECIFICATIONS TO PHYSICAL REGISTERS IN A PIPELINED PROCESSOR -- therefor.

<u>Column 7,</u>
Line 9, insert -- register -- before "mapping".
Line 35, delete "accusing" and insert -- accessing -- therefor.
Line 42, delete "nan" and insert -- names -- therefor.
Line 61, delete "and" after "specification;".

<u>Column 8,</u>
Line 12, delete "and" after "specification;".
Line 27, delete "byte" and insert -- by the -- therefor.
Line 31, delete "and" after "specification;".
Line 53, delete "and" after "instruction;".
Line 54, delete "repealing" and insert -- repeating -- therefor.
Line 67, insert -- one -- before "additional".

<u>Column 9,</u>
Line 17, delete "and" after "address;".
Line 24, delete "die" and insert -- the -- therefor.
Line 34, delete "and" after "instruction;".

<u>Column 10,</u>
Line 1, delete ";" after "comprising" and insert -- : -- therefor.
Line 19, delete "and" after "address;".
Line 23, delete "and" after "variables;".
Line 33, delete "and" after "instruction;".

Signed and Sealed this

Sixth Day of January, 2004

JAMES E. ROGAN
*Director of the United States Patent and Trademark Office*